(12) United States Patent
Hsu (10) Patent No.: US 10,001,162 B2
(45) Date of Patent: Jun. 19, 2018

(54) LABORSAVING ROTATION SHAFT DEVICE

(71) Applicant: JARLLYTEC CO., LTD., New Taipei (TW)

(72) Inventor: Yu-Tsun Hsu, New Taipei (TW)

(73) Assignee: JARLLYTEC CO., LTD., New Taipei (TW)

(*) Notice: Subject to any disclaimer, the term of this patent is extended or adjusted under 35 U.S.C. 154(b) by 0 days. days.

(21) Appl. No.: 15/462,240

(22) Filed: Mar. 17, 2017

(65) Prior Publication Data

US 2018/0087563 A1    Mar. 29, 2018

(30) Foreign Application Priority Data

Sep. 26, 2016  (TW) .............................. 105214733 U (51) Int. Cl.
  *E05D 1/04*    (2006.01)
  *E05D 11/06*   (2006.01)
  (Continued)

(52) U.S. Cl.
  CPC ................ *F16C 11/04* (2013.01); *E05D 3/12* (2013.01); *E05D 11/00* (2013.01); *F16H 21/44* (2013.01); *F16M 13/005* (2013.01)

(58) Field of Classification Search
  CPC ... Y10T 16/542; Y10T 16/543; Y10T 16/544; Y10T 16/5443; Y10T 16/5445; Y10T 16/5448; Y10T 16/545; Y10T 16/54038; G06F 1/16; G06F 1/1616; G06F 1/1681; G06F 1/166; G06F 1/1679; H04M 1/022; H04M 1/0214; H04M 1/0216; H04M 1/0222; H05K 5/0226; F16M 11/10; E05D 11/1021; E05D 11/1078; E05D 11/082; E05D 3/18; E05D 3/122; E05D 3/12; E05D 3/16; E05D 3/06; E05D 3/32;
  (Continued)

(56) References Cited

U.S. PATENT DOCUMENTS 1,618,781 A * 2/1927 Reuleke ................... A42B 1/18
                                                    2/175.6
4,342,135 A * 8/1982 Matsuo ...................... F16F 9/12
                                                     16/225

(Continued)

FOREIGN PATENT DOCUMENTS

CN    205260602 U    5/2016
TW    M518458        3/2016

*Primary Examiner* — Chuck Mah
(74) *Attorney, Agent, or Firm* — Guice Patents PLLC (57) ABSTRACT

A laborsaving rotation shaft device comprises a base; a first rotation unit; a pair of second rotation units, a first rotation guiding structure is disposed between the second rotation unit and the base, and a second rotation guiding structure is disposed between the second rotation unit and the first rotation unit; a torsion unit, having a connection rod, a friction torsion mechanism is disposed between the connection rod and the first rotation unit; a slide mechanism, including a slide block pivoted to the connection rod and radially formed with at least one slide hole allowing a slide rod to be received, and a spring sleeved on the slide rod; with an energy releasing or energy storing effect provided by the spring, the slide block is able to provide a torsion, which has effects of automatically unfolding and folding assistance, to the first rotation unit.

10 Claims, 11 Drawing Sheets

(51) Int. Cl.
F16C 11/04 (2006.01)
F16H 21/44 (2006.01)
E05D 3/12 (2006.01)
E05D 11/00 (2006.01)
F16M 13/00 (2006.01)

(58) Field of Classification Search
CPC ......... E05D 15/28; E05D 15/30; E05D 15/32; E05D 15/40; E05D 1/04; E05D 2001/045; E05Y 2900/606
See application file for complete search history.

(56) References Cited

U.S. PATENT DOCUMENTS

| | | | | |
|---|---|---|---|---|
| 4,642,449 A * | 2/1987 | Baitz | ................... | G07G 1/0027 235/1 B |
| 5,061,023 A * | 10/1991 | Soubliere | ................. | E05D 1/04 16/355 |
| 5,168,426 A * | 12/1992 | Hoving | ................. | G06F 1/1681 16/361 |
| 5,566,424 A * | 10/1996 | Crompton | ............. | G06F 1/1601 16/337 |
| 6,292,981 B1 * | 9/2001 | Ford | ......................... | E05D 1/04 16/357 |
| 6,317,929 B1 * | 11/2001 | Ring | ......................... | E05D 1/04 16/355 |
| 6,351,535 B1 * | 2/2002 | Nogas | ..................... | H04M 1/12 379/435 |
| 7,337,499 B2 * | 3/2008 | Zhang | ................. | G03G 21/1666 16/286 |
| 8,272,104 B2 * | 9/2012 | Chen | .................... | G06F 1/1616 16/327 |
| 8,453,299 B2 * | 6/2013 | Li | .......................... | G06F 1/1624 16/257 |
| 8,713,757 B2 * | 5/2014 | Chen | .................... | G06F 1/1616 16/327 |
| 8,763,206 B1 * | 7/2014 | Gong | ....................... | E05D 1/04 16/355 |
| 8,769,773 B2 * | 7/2014 | Katsuta | ................. | G06F 1/1624 16/286 |
| 2005/0225934 A1 * | 10/2005 | Homer | .................. | G06F 1/1616 361/679.21 |
| 2007/0180657 A1 * | 8/2007 | Zeilbeck | ................. | B60R 7/06 16/354 |
| 2010/0299879 A1 * | 12/2010 | Yang | ........................ | E05D 3/04 16/387 |
| 2011/0023272 A1 * | 2/2011 | Huang | ...................... | E05D 3/18 16/362 |
| 2011/0216483 A1 * | 9/2011 | Vesely | .................. | B60N 3/004 361/679.01 |
| 2012/0175478 A1 * | 7/2012 | Chen | .................... | G06F 1/1624 248/286.1 |
| 2012/0227217 A1 * | 9/2012 | Chen | .................... | G06F 1/1681 16/366 |
| 2015/0378392 A1 * | 12/2015 | Siddiqui | ............... | G06F 1/1618 361/679.27 |
| 2016/0083989 A1 * | 3/2016 | Kuo | ......................... | E05D 1/04 16/355 |
| 2016/0097227 A1 * | 4/2016 | Hsu | .......................... | G06F 1/16 16/354 |
| 2016/0369543 A1 * | 12/2016 | Park | ..................... | E05D 11/082 |

* cited by examiner

LABORSAVING ROTATION SHAFT DEVICE

BACKGROUND OF THE INVENTION

1. Field of the Invention

The present invention relates to a rotation shaft device, especially to a laborsaving rotation shaft device disposed between a flat electronic device and a supporter.

2. Description of Related Art

A flat electronic device, for example a tablet computer or an all in one (MO) computer, is pivoted with a supporter for enabling the flat electronic device to be arranged in a standing status, and the supporter is connected with a rotation shaft device for achieving effects of rotating (for unfolding or folding) and supporting the tablet computer to be in the standing status. The rotation shaft device includes a core shaft and a friction disk disposed on the core shaft, at least one elastic disk or a spring, and an anti-loosening nut.

Wherein, the main component for achieving the rotation effect is the core shaft, one end of the core shaft is pivoted with the supporter located in a rotation center line, and the other end of the core shaft is pivoted with the flat electronic device, so that the supporter is able to be rotated relative to the flat electronic device. If an obvious torsion varying and positioning effect is desired to be provided, the core shaft is sleeved with a set of interfering units capable of being mutually pressed or engaged (as known as a cam mechanism). As such, the rotation shaft device is the main component enabling the flat electronic device to be easily converted from a horizontal status into the standing status.

However, when a user touches for operating the flat electronic device, for example a tablet computer, the tablet computer shall not only be horizontally placed but also the tablet computer should be provided with a function of adjusting the standing angle in a stage-less or multi-stage means, but the above-mentioned rotation shaft device can only be used for supporting the tablet computer without the stage-less or multi-stage adjusting and positioning effect, so that the tablet computer is unable to be provided with a stably positioning effect while being in the standing status at various angles. In addition, the core shaft of the rotation shaft device and the rotation center line of the supporter are coaxially arranged, so that the pivoting portion of the tablet computer may be relatively protruded and not easily be shield by the supporter, when the supporter is folded to be adjacent to a wall surface of the tablet computer, a flatly and adjacently arranging effect of the supporter may be affected.

As such, skilled people in the art have developed various rotation shaft devices suitable to be used in the tablet computer and the supporter for improving the shortages of the above-mentioned rotation shaft device, take the automatic bouncing shaft apparatus disclosed in Taiwan Patent No. M518458 for example, the interior thereof has a case body formed with an accommodation space, a torsion and elastic force biased mechanism and a torsion generating device are disposed in the accommodation space, the torsion and elastic force biased mechanism includes a biased mechanism having a pressing block, and the biased mechanism is connected and linked with a connection sheet, the torsion generating device is disposed and fastened in the biased mechanism; and an elastic unit is abutted against the pressing block; when the connection sheet is released from an positioned status, the biased mechanism is linked for enabling the torsion generating device to be outwardly and biasedly rotated, the pressing block is inclined due to the biased rotation, and the elastic unit is able to allow the biased mechanism to be automatically bounced to a preset angle, so that a user can easily operate the shaft apparatus.

Moreover, take the hinge of displacement terminal and the displacement terminal disclosed in China Patent No. CN205260602 for example, the hinge of displacement terminal includes a first rotation body, the first rotation body is connected to a friction structure for providing a function of stopping and positioning at any desired timing, the first rotation body and the friction structure are connected by utilizing a connection rod mechanism. The friction structure includes a friction sleeve and a shaft capable of being oppositely displaced along the axial direction, the first rotation body is connected to the friction sleeve capable of being axially displaced relative to the shaft via the connection rod structure, thereby driving the friction sleeve to be axially displaced. In other words, the connection rod mechanism is able to convert the friction force generated by the axial opposite displacement into a torsion, and different friction forces can be outputted through the friction sleeve working with the friction shaft having dimension variation defined at different locations. However, the above-mentioned friction structure can only provide a timely positioning function to the tablet computer and the supporter.

During the process of the supporter being rotated for being unfolded or folded relative to the tablet computer disclosed in the two above-mentioned patents, besides the friction torsion, an auxiliary torsion is unable to be continuously provided for stabilizing the variation of the friction torsion, and under the situation of an external force being applied for operating the tablet computer, for example texting, tapping or sliding, and the gravity of the tablet computer itself, the angle of the supporter relative to the tablet computer would be unintentionally altered which may cause inconvenience to the user. As such, the above-mentioned disadvantages shall be improved.

SUMMARY OF THE INVENTION

One primary objective of the present invention is to provide a laborsaving rotation shaft device, in which an energy releasing function of a slide mechanism can be utilized for generating a laborsaving effect with functions of automatically unfolding and folding assistance during two motions of unfolding and folding.

For achieving said objective, one technical solution provided by the present invention is to provide a laborsaving rotation shaft device, which comprises: a base, having a hollow slot formed between a pair of lateral walls thereof; a first rotation unit, disposed between the pair of lateral walls, wherein the first rotation unit is formed with a pair of outer walls and a pair of inner walls; a pair of second rotation units, sharing a common rotation center with the first rotation unit, wherein a first rotation guiding structure is disposed between each of the pair of second rotation units and each of the pair of lateral walls, and a second rotation guiding structure is disposed between each of the pair of second rotation units and each of the pair of outer walls; a torsion unit, having a connection rod, wherein a friction torsion mechanism is disposed between one end of the connection rod and the pair of inner walls; a slide mechanism, including a slide block disposed in the hollow slot and pivoted to another end of the connection rod, wherein the slide block is radially formed with at least one slide hole, each of the at least one slide hole allows a slide rod to be received, and a spring is respectively sleeved on the slide rod, and two distal ends of the slide rod are disposed in a pair of rod slots radially and oppositely formed at the bottom portion of the base; the slide block is able to radially slide on at least one the slide rod via a linking effect provided by the torsion unit and the first rotation unit, and with an energy releasing or energy storing effect of each of the springs, the slide block is able to provide a torsion, which has effects of automatically unfolding or folding assistance, to the first rotation unit.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Referring from FIG. 1 to FIG. 6, the present invention provides a laborsaving rotation shaft device, which comprises a base 1, a first rotation unit 2, a pair of second rotation units 3, a torsion unit 4 and a slide mechanism 5.

Figure 4:
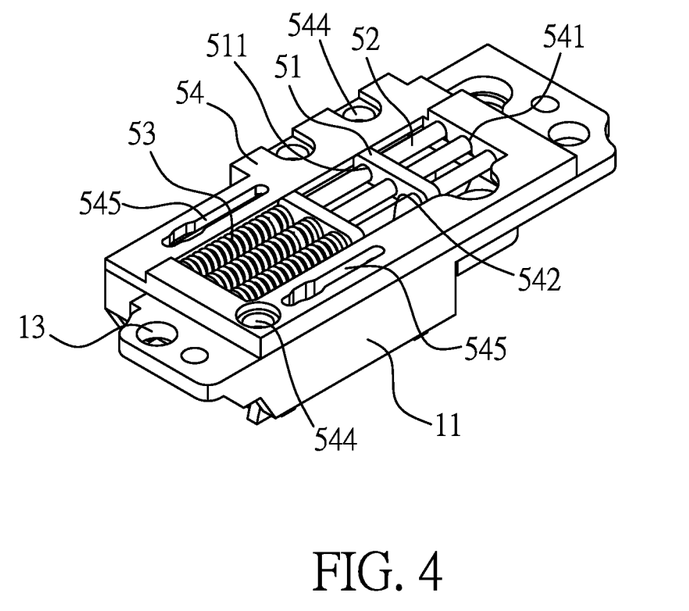
FIG. 4 is another perspective view illustrating the laborsaving rotation shaft device be assembled and pressed by the supporter according to the present invention.

The base 1 is formed as a rectangular seat member, a hollow slot 12 is formed between a pair of lateral walls 11 thereof, and a space defined between the pair of lateral walls 11 is served to allow the first rotation unit 2 and the pair of second rotation units 3 to be accommodated and rotated therein. For allowing the first rotation unit 2 and the pair of second rotation units 3 to be smoothly rotated between the pair of lateral walls 11, adjacent surfaces of the pair of lateral walls 11 and the pair of second rotation units 3 are respectively formed with a first rotation guiding structure, for example a first arc-shaped guiding slot 111 and a first arc-shaped guiding rail 31, so that the pair of second rotation units 3 can be rotated along a pair of first arc-shaped guiding slots 111 via a pair of the first arc-shaped guiding rails 31, the bottom portion of the base 1 is respectively formed with an elongated slit 545 corresponding to each of the pair of second rotation units 3 (as shown in FIG. 4, the elongated slits 545 penetrate the bottom surface of the base 1), each of the elongated slits 545 allows one end of each of the pair of second rotation units 3 to enter and pass, thereby enabling the pair of second rotation units 3 in a rotating status to be parallel with each other. Moreover, the base 1 is formed with at least one first fasten hole 13, so that a conventional fasten member, for example a screw, can be utilized for passing and being fastened with a flat electronic device 6, for example a tablet computer.

The first rotation unit 2 is disposed between the pair of lateral walls 11 of the base 1, and the first rotation unit 2 includes a left rotation member 21 and a right rotation member 22 which are in an engaged status. The left rotation member 21 and the right rotation member 22 are formed with a pair of outer walls 23, a pair of inner walls 24 is axially and correspondingly disposed with a core shaft 25, and distal axial ends are respectively formed with a first connection hole 26, and a conventional fasten member, for example a screw, is utilized for passing the first connection holes 26 and being fastened with a supporter 7.

Figure 1:
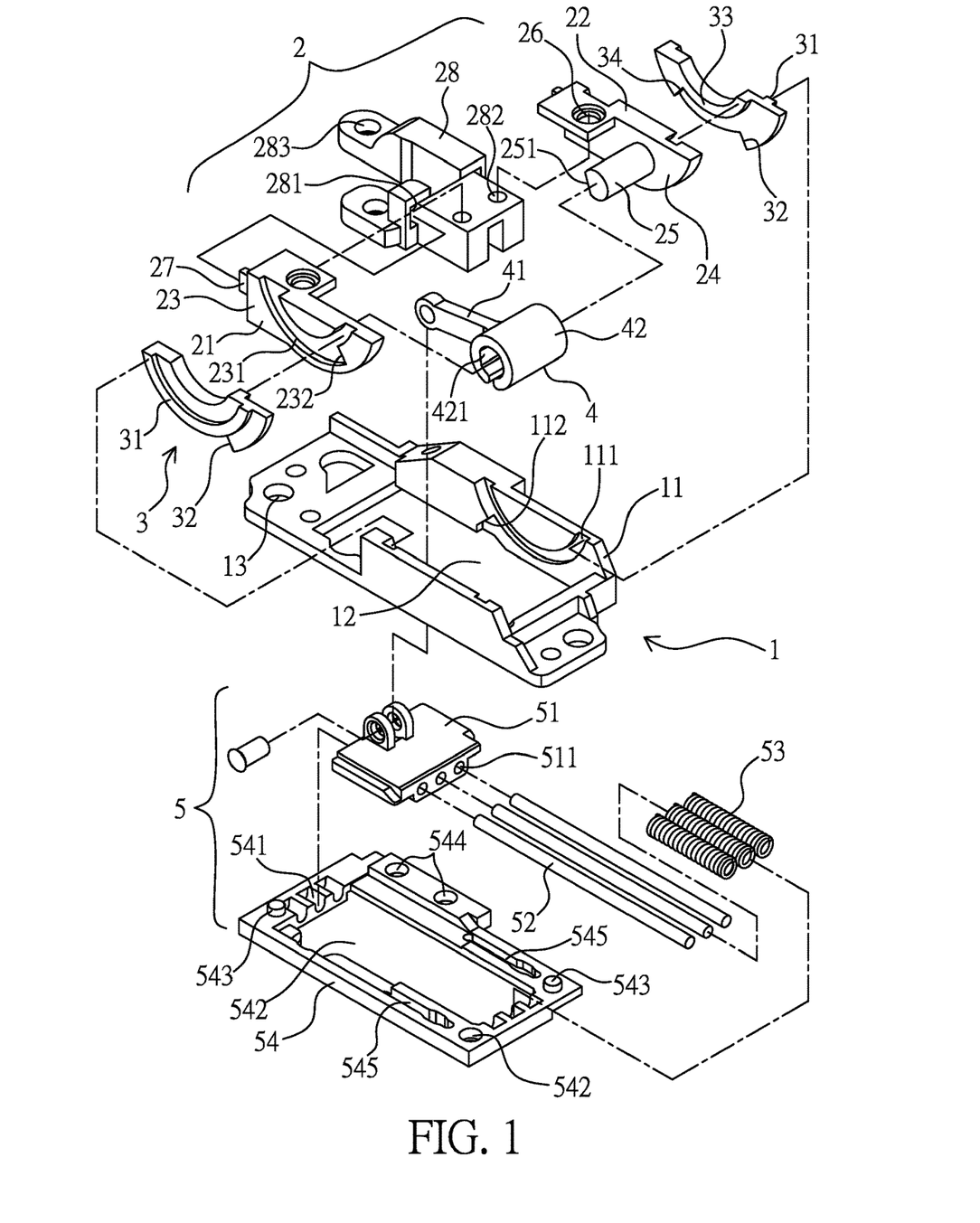
FIG. 1 is a perspective exploded view illustrating a laborsaving rotation shaft device according to the present invention.
Figure 2:
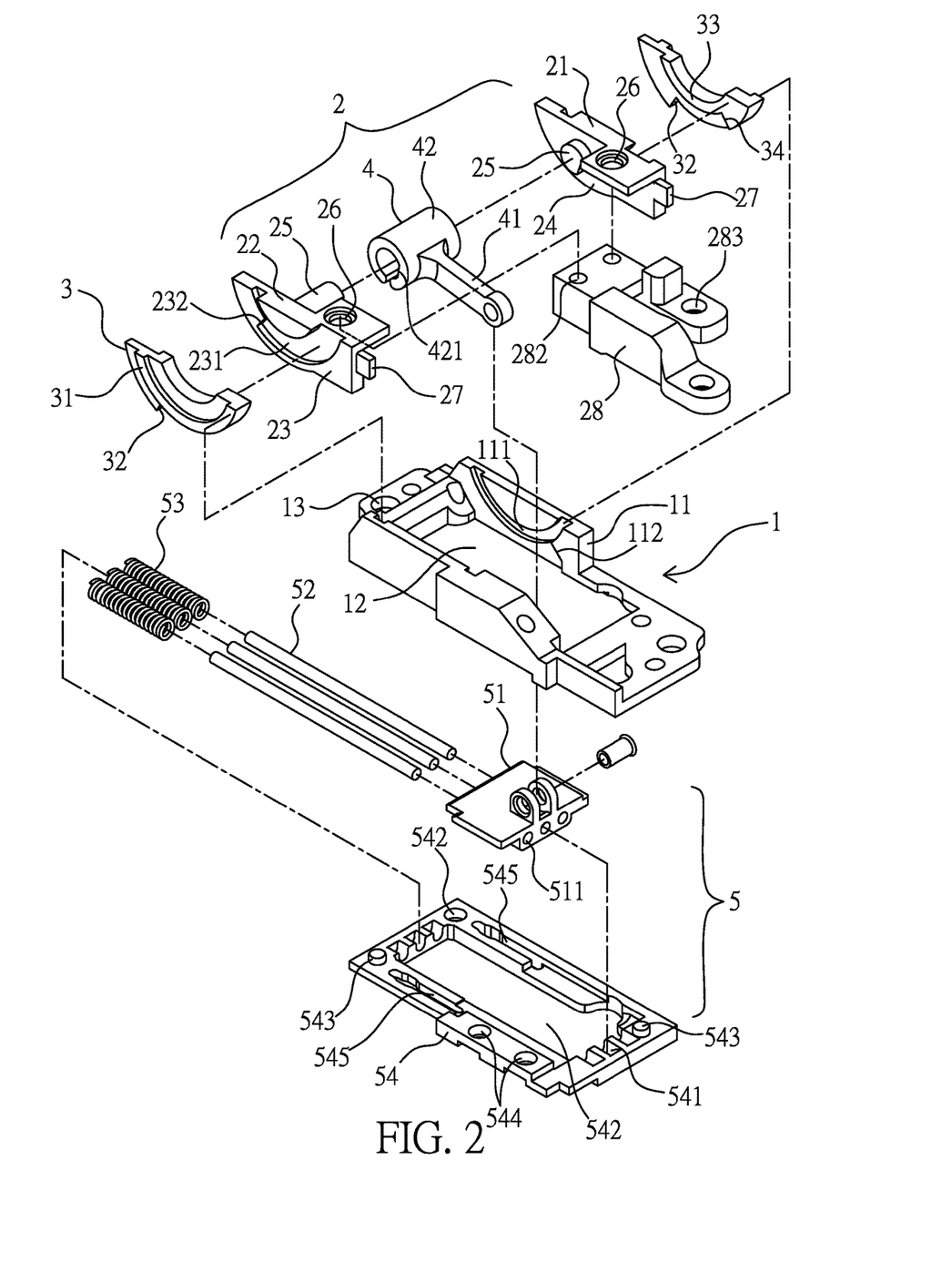
FIG. 2 is another perspective exploded view illustrating the laborsaving rotation shaft device according to the present invention.

According to another embodiment, the first rotation unit 2 further includes a connection member 28, the connection member 28 is disposed at a rear end of the first rotation unit 2, as shown in FIG. 1 and FIG. 2, rear ends of the left rotation member 21 and the right rotation member 22 are respectively formed with a positioning tenon 27, and a front end of the connection member 28 is formed with two positioning slots 281 allowing the positioning tenons 27 to be inserted and positioned. A conventional fasten member, for example a screw, is utilized for passing each of the first connection holes 26 and being fastened in a second connection hole 282 correspondingly formed on the connection member 28, so that the left rotation member 21, the right rotation member 22 and the connection member 28 are enabled to be combined as one piece. In other words, the first rotation unit 2 and the connection member 28 can be combined as one piece by utilizing a positioning and fastening mechanism for forming a linking status. A rear end of the connection member 28 is formed with at least one second fasten hole 283, and a conventional fasten member, for example a screw, is utilized for passing the at least one second fasten hole 283 and being fastened with the supporter 7 (as show in FIG. 6).

The pair of second rotation units 3 are respectively disposed between each of the pair of lateral walls 11 of the base 1 and each of the pair of outer walls 23 of the first rotation unit 2, and the first rotation unit 2 and the pair of second rotation units 3 share a common rotation center.

Based on what has been disclosed above, the above-mentioned first rotation guiding structure is respectively disposed between each of the pair of second rotation units 3 and each of the pair of lateral walls 11 of the base 1, for example the first arc-shaped guiding slot 111 and the first arc-shaped guiding rail 31, so that the pair of second rotation units 3 are able to be rotated along the pair of first arc-shaped guiding slots 111 via the pair of first arc-shaped guiding rails 31. In addition, a second rotation guiding structure is respectively disposed between each of the pair of outer walls 23 of the first rotation unit 2 and each of the pair of second rotation units 3, for example a second arc-shaped guiding slot 231 and a second arc-shaped guiding rails 33, so that the first rotation unit 2 is able to be rotated along the pair of second arc-shaped guiding rails 33 via the pair of second arc-shaped guiding slots 231.

Moreover, for forming a limitation to the maximum unfolding angle of the first rotation unit 2, a circumference of each of the first arc-shaped guiding slots 111 is communicated with a first position limiting block 112, and each of the pair of second rotation units 3 is respectively and correspondingly disposed with a first position limiting protrusion 32 capable of being abutted against the first position limiting block 112, a circumference of each of the second arc-shaped guiding slots 231 is communicated with a second position limiting block 232, and each of the pair of second rotation units 3 is respectively and correspondingly disposed with a second position limiting protrusion 34 capable of being abutted against the second position limiting block 232.

Figure 7A:
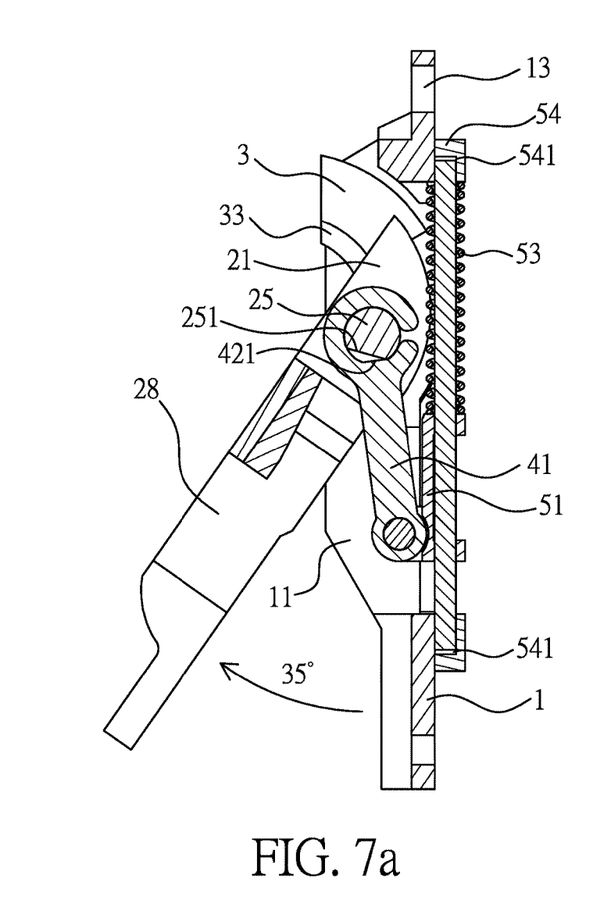
FIG. 7a is a cross sectional view illustrating the supporter being in an unlocked status and the laborsaving rotation shaft device being in a status of being automatically unfolded to 35 degrees according to the present invention.
Figure 8A:
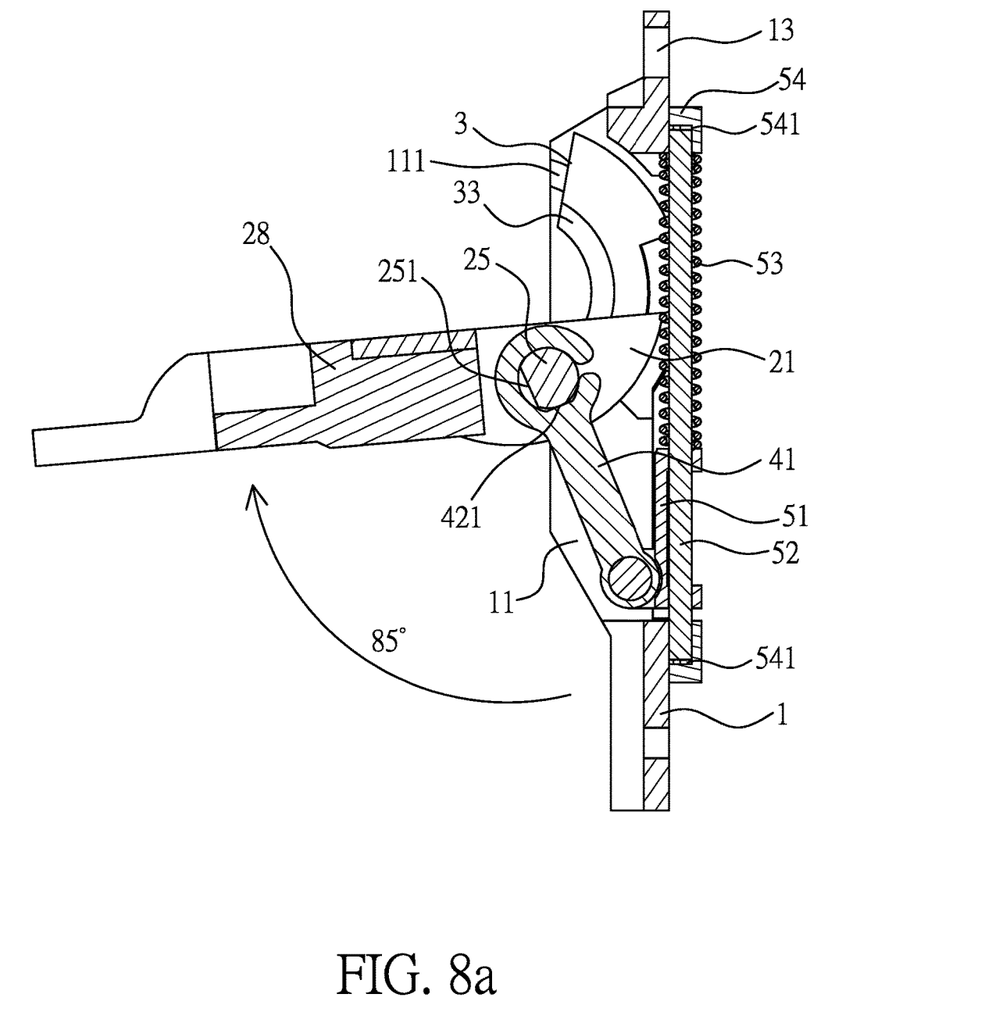
FIG. 8a is a cross sectional view illustrating the laborsaving rotation shaft device being in a status of being unfolded to 85 degrees according to the present invention.
Figure 9A:
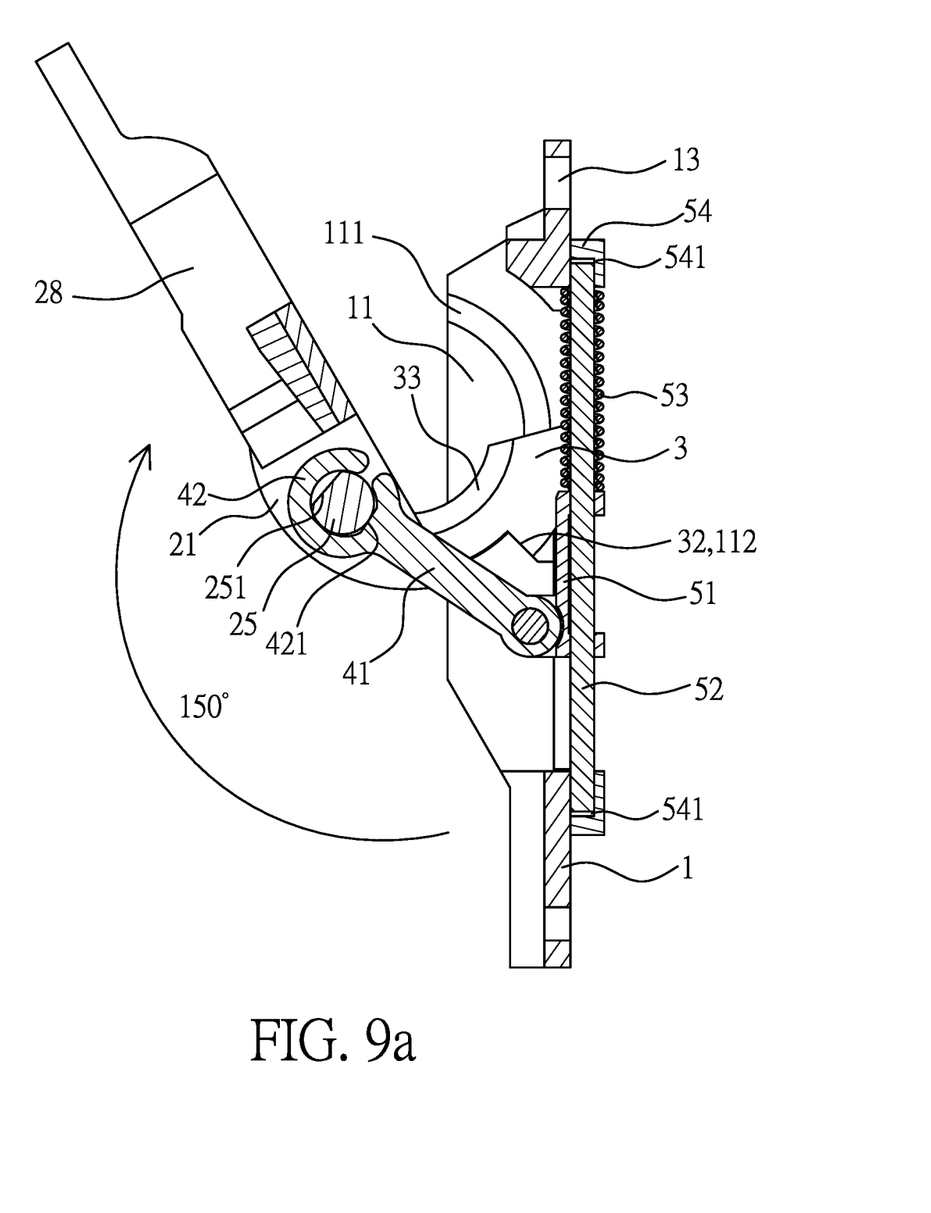
FIG. 9a is a cross sectional view illustrating the laborsaving rotation shaft device being in a status of being unfolded to 150 degrees according to the present invention.

The torsion unit 4 is disposed with a connection rod 41, one end of the connection rod 41 is axially formed with a C-shaped covering member 42 sleeved on the core shaft 25, the other end of the connection rod 41 is pivoted with the slide mechanism 5. In other words, a friction torsion mechanism is formed by the core shaft 25 and the C-shaped covering member 42. An outer circumference of the core shaft 25 is formed with a first plane 251, and an inner circumference of the C-shaped covering member 42 is formed with a second plane 421, so that when the core shaft 25 is rotated to different angles, the C-shaped covering member 42 is able to be pressed or loosened (not being pressed) for allowing different radial widths to be formed; as such, when the core shaft 25 of the first rotation unit 2 is rotated to an angle at which the C-shaped covering member 42 is pressed (as shown in FIG. 7a, FIG. 8a and FIG. 9a), a friction torsion is formed for enabling the supporter 7 connected to the first rotation unit 2 to be provided a freely stopping effect within an angle range, for example 35 to 150 degrees.

The slide mechanism 5 includes a slide block 51 disposed in the hollow slot 12 and pivoted to one end of the connection rod 41, the slide block 51 is radially formed with at least one slide hole 511, each of the at least one slide hole 511 allows a slide rod 52 to be received, and a spring 53 is respectively sleeved on each of the slide rods 52, then two distal ends of each of the slide rods 52 are disposed in a pair of rod slots 541 radially and oppositely formed at the bottom portion of the base 1, but it is to be noted that the structure of the bottom portion of the base 1 is not limited thereto, the bottom portion of the base 1 can also be formed as a detachable bottom seat 54, the bottom seat 54 is formed with an accommodation part 542 communicated with the hollow slot 12, and the pair of rod slots 541 are radially formed at two opposite sides of the accommodation part 542, lastly the bottom seat 54 is fastened at the bottom end of the base 1, for example a conventional positioning structure for example two convex tenons 543 at diagonal corners of the bottom seat 54 are respectively mounted in two tenon holes 14 correspondingly formed on the bottom surface of the base 1 (the tenon holes 14 are respectively shown in FIG. 5b, FIG. 8b and FIG. 9b), thereby allowing a positioning status to be formed, and a conventional fasten member, for example a screw, is utilized for passing at least two penetrated holes 544 formed on the bottom seat 54 and being fastened at the bottom end of the base 1, thereby allowing the base 1 and the bottom seat 54 to be combined as one piece, and the slide block 51 is able to radially slide on at least one the slide rod 52 via a linking effect provided by the torsion unit 4 and the first rotation unit 2, and the slide block 51 is able to provide an auxiliary torsion to the first rotation unit 2 through each of the springs 53 being stretched (releasing energy) or compressed (storing energy), thereby providing a laborsaving effect.

Moreover, the bottom seat 54 is respectively formed with an elongated slit 545 corresponding to each of the pair of second rotation units 3, so that each of the first position limiting protrusions 32 is allowed to enter or pass the elongated slit 545 for enabling the pair of second rotation units 3 in the rotating status to be parallel with each other.

Figure 3:
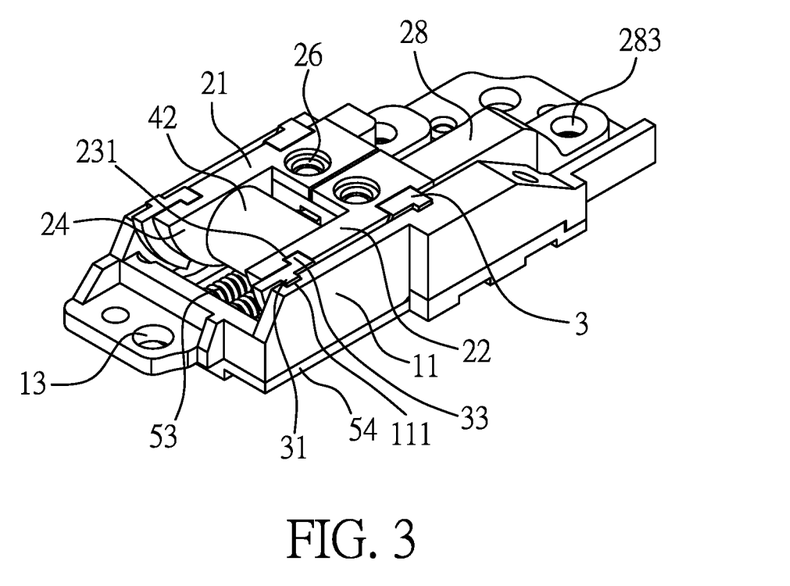
FIG. 3 is a perspective view illustrating the laborsaving rotation shaft device be assembled and pressed by a supporter according to the present invention.

Based on what has been disclosed above, after the base 1, the first rotation unit 2, the pair of second rotation units 3, the torsion unit 4 and the slide mechanism 5 are assembled, the front and the rear perspective views of the laborsaving rotation shaft device are as shown in FIG. 3 and FIG. 4. Wherein, the first rotation unit 2 is defined as in a status of zero degree because the supporter 7 is in a locked and pressed status.

Figure 6:
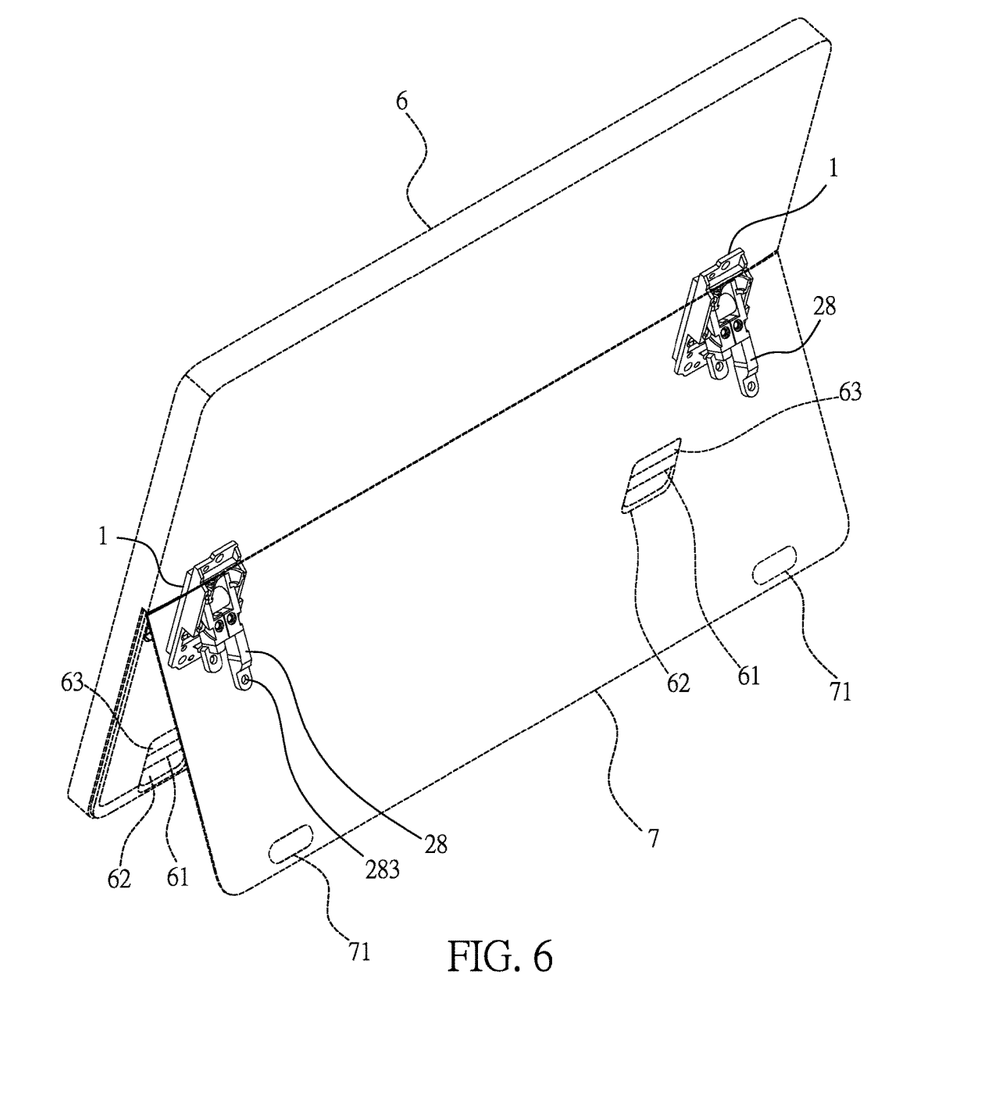
FIG. 6 is a perspective view illustrating the laborsaving rotation shaft device being assembled with a flat electronic device and the supporter according to the present invention.

When being assembled, a pair of bases 1 of a pair of laborsaving rotation shaft devices are connected at two sides defined on a rear surface of a tablet computer 6, a pair of first rotation units 2 of the pair of laborsaving rotation shaft devices are connected at two sides defined at the front end of a supporter 7, two adjacent surfaces of the rear surface of the tablet computer 6 and the supporter 7 are respectively disposed with a pair of movable magnets 61 and a pair of fixed magnets 71 (as shown in FIG. 6), so that the supporter 7 is able to press the pair of first rotation units 2 through an attracting effect provided by the pair of movable magnets 61 and the pair of fixed magnets 71, and the supporter 7 is in a locked status at zero degree relative to the tablet computer 6. The pair of movable magnets 61 are respectively accommodated in an accommodation slot 62 formed at two sides defined on the rear surface of the tablet computer 6, and one side defined in each of the accommodation slots 62 is disposed with a magnetic member 63, for example an iron sheet or a magnet, at a location which is not corresponding to each of the fixed magnets 71, so that when each of the fixed magnets 71 is yet fully attracted to each of the movable magnets 61, each of the magnetic members 63 is able to respectively attract each of the movable magnets 61 to be displaced for forming an unlocked status.

Figure 5A:
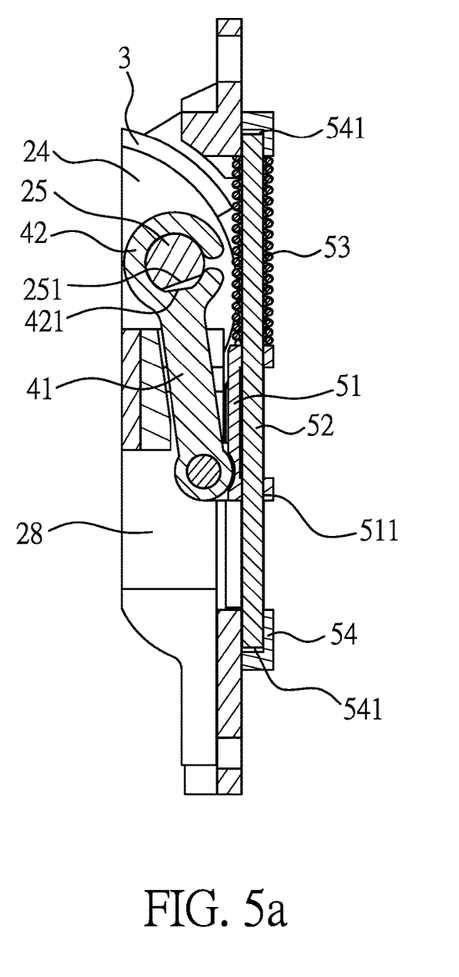
FIG. 5a is a cross sectional view illustrating the supporter being in a lucked status and the laborsaving rotation shaft device being in a status of zero degree according to the present invention.
Figure 5B:
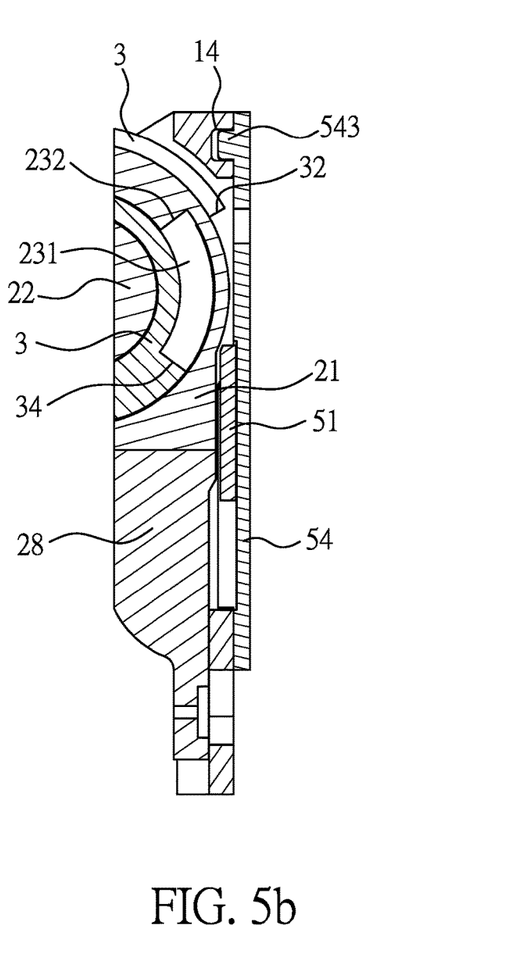
FIG. 5b is another cross sectional view illustrating the supporter being in the lucked status and the laborsaving rotation shaft device being in the status of zero degree according to the present invention.

As shown in FIG. 5a and FIG. 5b, when the supporter 7 is in the locked status at zero degree relative to the tablet computer 6, the first arc-shaped guiding rail 31 of the second rotation unit 3 is received in the first arc-shaped guiding slot 111, the second arc-shaped guiding rail 33 is received in the second arc-shaped guiding slot 231, so that the first rotation unit 2 is pressed, and the slide block 51 is pulled by the torsion unit 4 for enabling the slide block 51 to compress the spring 53 on each of the slide rods 52, and each of the springs 53 is in an energy storing status.

When the pair of fixed magnets 71 are yet fully attracted to the pair of movable magnets 61, and the pair of movable magnets 61 are displaced due to a magnetic attraction force of the pair of magnetic members 63, thus the attracting status of the pair of movable magnets 61 and the pair of fixed magnets 71 are released and the unlocked status is formed. After the unlocked status is formed, the slide mechanism 5 is able to work with the torsion unit 4 and the friction torsion mechanism for forming a first laborsaving motion having an automatically unfolding effect.

Figure 7B:
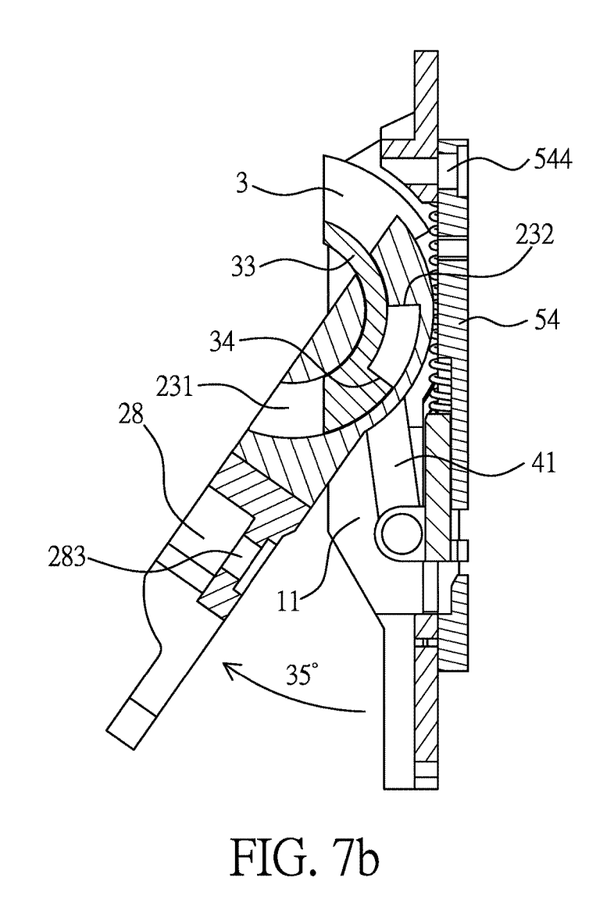
FIG. 7b is another cross sectional view illustrating the supporter being in the unlocked status and the laborsaving rotation shaft device being in the status of being automatically unfolded to 35 degrees according to the present invention.

In the first laborsaving motion, when the core shaft 25 of the friction torsion mechanism is rotated, the C-shaped covering member 42 is not pressed, so that the auxiliary torsion generated by the slide mechanism 5 is able to allow the supporter 7 to be automatically rotated to a first preset angle, for example 35 degrees, relative to the tablet computer 6, as shown in FIG. 7a and FIG. 7b, with the energy released by the spring 53 of each of the slide rods 52, the slide block 51 is pushed for being downwardly and radially displaced with the torsion unit 4, at this moment, the first arc-shaped guiding rail 31 of the second rotation unit 3 is still received in the first arc-shaped guiding slot 111, and the second arc-shaped guiding slot 231 of the first rotation unit 2 is rotated to the first preset angle, for example 35 degrees, along the second arc-shaped guiding rail 33 of the second rotation unit 3, so that the supporter 7 is provided with the first laborsaving motion having the automatically unfolding effect as shown in FIG. 6. As shown in FIG. 6, at this moment, the tablet computer 6 is able to be in a standing status through the automatically unfolding effect provided by the laborsaving rotation shaft device to the supporter 7, so that a user can easily view images displayed by the tablet computer 6.

Figure 8B:
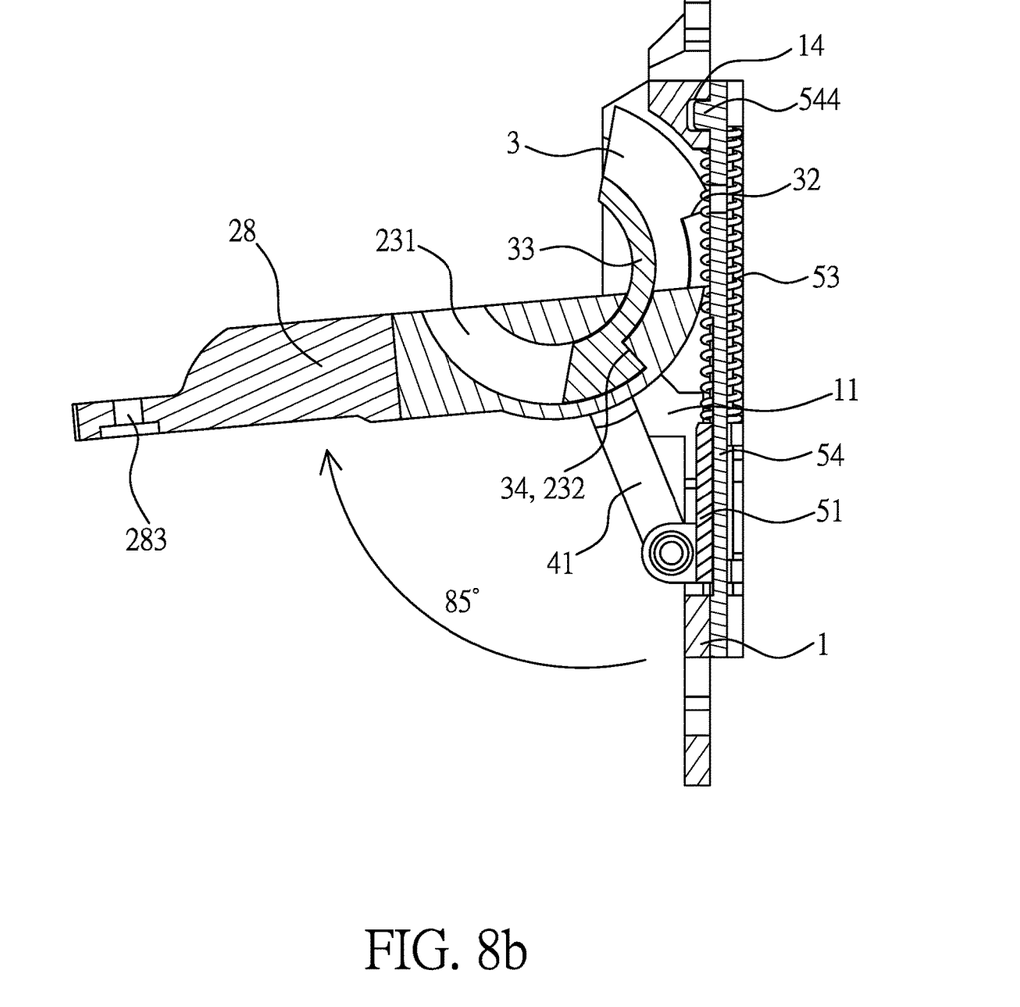
FIG. 8b is another cross sectional view illustrating the laborsaving rotation shaft device being in the status of being unfolded to 85 degrees according to the present invention.

When the user further unfolds the supporter 7, the spring 53 of each of the slide rods 52 is still in an energy releasing status for continuously pushing the slide block 51 for displacement, until the second arc-shaped guiding slot 231 of the first rotation unit 2 is rotated to a second preset angle, for example 85 degrees, along the second arc-shaped guiding rail 33 of the second rotation unit 3, as shown in FIG. 8a and FIG. 8b, the second position limiting block 232 has already pushed the second position limiting protrusion 34 of the second rotation unit 3 (as shown in FIG. 8b), so that the second arc-shaped guiding rail 33 is rotated along the second arc-shaped guiding slot 231, and the first arc-shaped guiding rail 31 is rotated along the first arc-shaped guiding slot 111. At this moment, the core shaft 25 is downwardly displaced to a maximum displacement ending point along the process of the first rotation unit 2 being rotated, so that the torsion unit 4 is able to pull the slide block 51 for the purpose of recovery, but the spring 53 is not yet fully stretched and can still provide an auxiliary torsion, and one end of each of the first position limiting protrusions 32 is allowed to enter each of the corresponding elongated slits 545, so that each of the pair of second rotation units 3 is prevented from being inclined during rotations.

On the other hand, during the process of the first rotation unit 2 being rotated from the first preset angle to the second preset angle, the friction torsion is gradually increased through the C-shaped covering member 42 being continuously pressed by the core shaft 25. As such, with the friction torsion and the auxiliary torsion, the gravity torque defined while the tablet computer 6 being in the standing status within the angle range can be supported and a freely stopping effect is also provided.

Figure 9B:
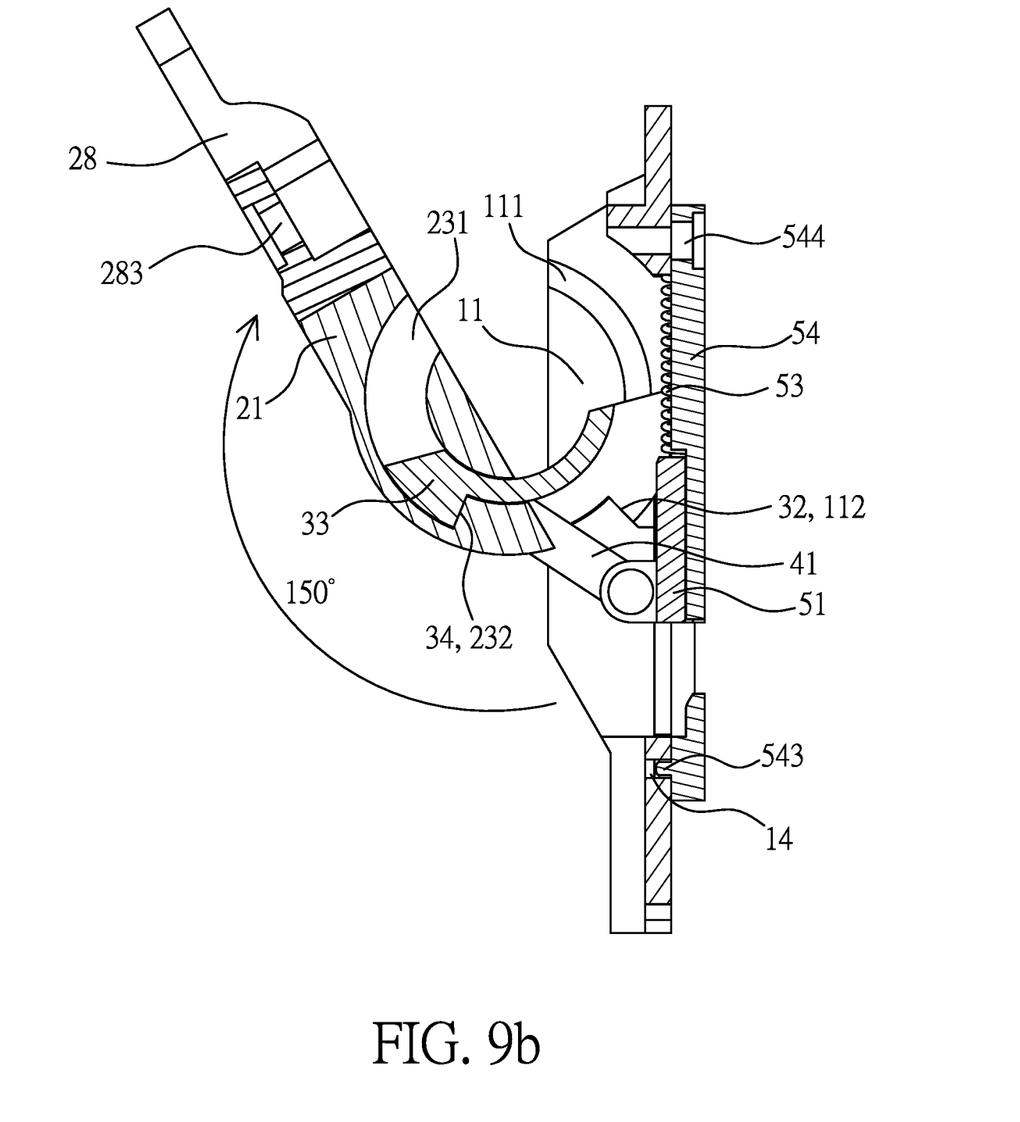
FIG. 9b is another cross sectional view illustrating the laborsaving rotation shaft device being in the status of being unfolded to 150 degrees according to the present invention.
Figure 9C:
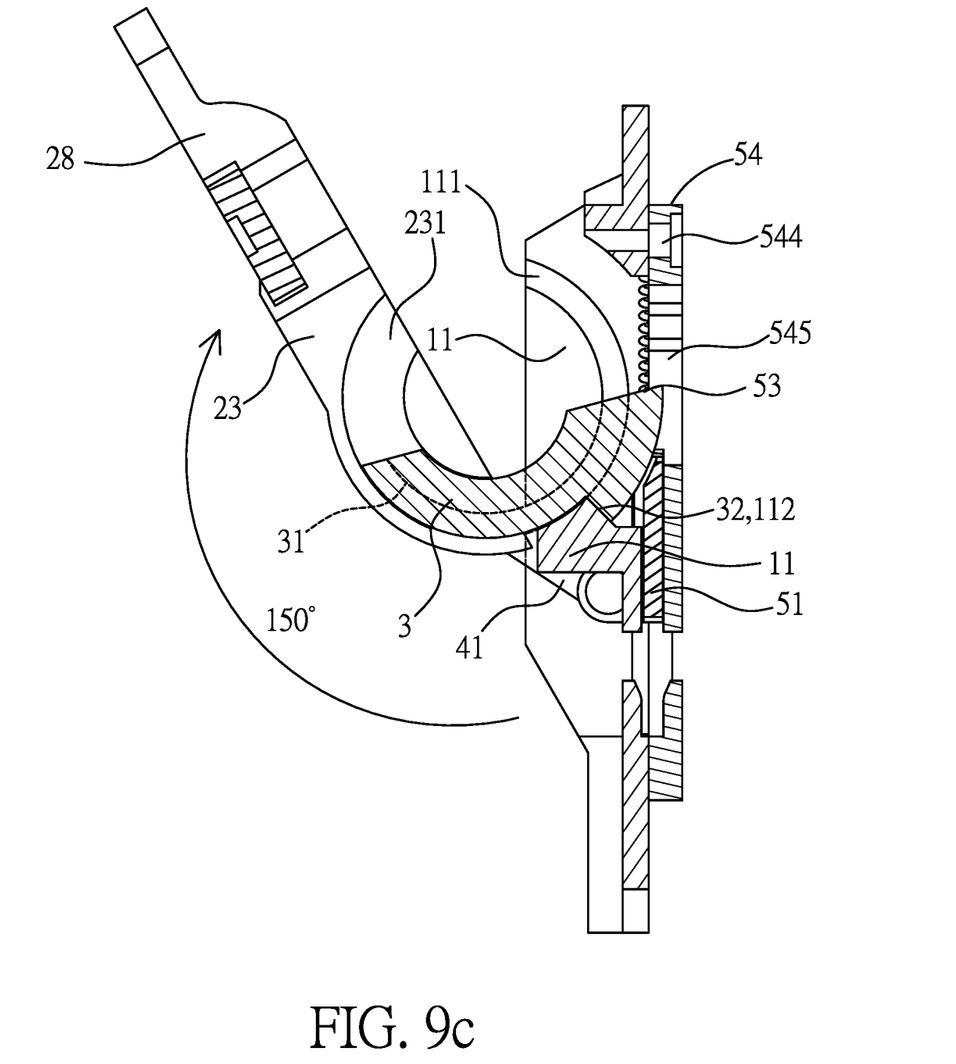
FIG. 9c is one another cross sectional view illustrating the laborsaving rotation shaft device being in the status of being unfolded to 150 degrees according to the present invention.

When the user further unfolds the supporter 7, and the second preset angle (85 degrees) is exceeded and a maximum unfolding angle is reached, as shown from FIG. 9a to FIG. 9c, the first rotation unit 2 is upwardly and radially displaced through the sliding block 51 being pulled by the torsion unit 4, and the spring 53 of each the slide rod 52 is compressed by the slide block 51 for allowing each of the springs 53 to be in the energy storing status, and during this process, the C-shaped covering member 42 is still continuously pressed by the core shaft 25 for gradually increasing the friction torsion. The second position limiting block 34 of the second rotation unit 3 (as shown in FIG. 9b) is still pushed by the second position limiting block 232, so that the second arc-shaped guiding rail 33 is rotated along the second arc-shaped guiding slot 231, and the first arc-shaped guiding rail 31 is rotated along the first arc-shaped guiding slot 111, and the first position limiting protrusion 32 is allowed to pass along the elongated slit 545, thus the pair of second rotation units 3 in the rotating status can be remained to be parallel with each other until one end of the first position limiting protrusion 32 being protruded out from the elongated slit 545 and abutted against the first position limiting block 112 (as shown in FIG. 9c), so that the first rotation unit 2 is formed with a maximum unfolding angle, for example 150 degrees.

When the first rotation unit 2 is located between the second preset angle, for example 85 degrees, and the maximum unfolding angle, for example 150 degrees, the user can place the tablet computer 6 on a table surface for processing various operation, for example texting, tapping or sliding, because the slide block 51 of the slide mechanism 5 is in a status of pressing each of the springs 53, an auxiliary torsion (a counter force) is provided, so that forces applied during the operations and the weight of the tablet computer 6 can be countered by the above-mentioned auxiliary torsion and the friction torsion between the core shaft 25 and the C-shaped covering member 42. As such, the unfolding angle of the supporter 7 relative to the tablet computer 6 can be prevented from being altered during the operations.

If the supporter 7 is desired to be folded, a reverse rotation, for example from 150 to 85 degrees, is processed, because the friction torsion generated by the friction torsion mechanism is gradually smaller than a friction torsion of a normal rotating motion within the same angle range, and each of the springs 53 of the slide mechanism 5 is allowed to gradually release energy, the slide block 51 is pushed for being downwardly and radially displaced with the torsion unit 4, so that a second laborsaving motion having a folding assistance effect is provided.

Based on what has been disclosed above, advantages achieved by the present invention are as followings: the slide mechanism is able to utilize each of the springs to release energy to the slide block during the two motions of unfolding and folding, and the friction torsion mechanism respectively allows the friction torsion to be gradually increased from zero and gradually decreased to zero friction torsion during the normal and the reverse rotation processes, so that the laborsaving effects having the automatically unfolding and folding assistance effects are provided; moreover, when being automatically unfolded, the freely stopping function is provided through the friction torsion mechanism, for example the core shaft and the C-shaped covering member, and the slide mechanism is able to continuously provide an elastic force for assistance during the whole rotation motion of the first rotation unit, so a consistent feeling is provided, in other words the rotation motion is smooth without any impediment; furthermore, with the installation of the slide mechanism, the applicable torsion value ranges can be increased for allowing the torsion value of the friction torsion mechanism to be adjusted according to actual needs.

Accordingly, the laborsaving rotation shaft device provided by the present invention is novel and more practical in use comparing to prior arts.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A laborsaving rotation shaft device, comprising:
   a base, having a hollow slot formed between a pair of lateral walls thereof;
   a first rotation unit, disposed between said pair of lateral walls, wherein said first rotation unit is formed with a pair of outer walls and a pair of inner walls;
   a pair of second rotation units, sharing a common rotation center with said first rotation unit, wherein a first rotation guiding structure is disposed between each of said pair of second rotation units and each of said pair of lateral walls, and a second rotation guiding structure is disposed between each of said pair of second rotation units and each of said pair of outer walls;
   a torsion unit, having a connection rod, wherein a friction torsion mechanism is disposed between one end of said connection rod and said pair of inner walls; and
   a slide mechanism, including a slide block disposed in said hollow slot and pivoted to another end of said connection rod, wherein said slide block is radially formed with at least one slide hole, each of said at least one slide hole allows a slide rod to be received, and a spring is respectively sleeved on each said slide rod, and two distal ends of each said slide rod are disposed in a pair of rod slots radially and oppositely formed at a bottom portion of said base; said slide block is able to radially slide on at least one said slide rod via a linking effect provided by said torsion unit and said first rotation unit, and with an energy releasing or energy storing effect of each said spring, said slide block is able to provide a torsion, which has effects of automatically unfolding or folding assistance, to said first rotation unit.

2. The laborsaving rotation shaft device as claimed in claim 1, wherein said bottom portion of said base is formed as a detachable bottom seat, said bottom seat is formed with an accommodation part communicated with said hollow slot, and said pair of rod slots are radially formed at two opposite sides of said accommodation part; said first rotation guiding structure is formed with a first arc-shaped guiding slot and a first arc-shaped guiding rail oppositely arranged between one of said pair of second rotation units and one of said pair of lateral walls, thereby enabling said first arc-shaped guiding rail to be rotated along said first arc-shaped guiding slot; and said second rotation guiding structure is formed with a second arc-shaped guiding slot and a second arc-shaped guiding rail oppositely arranged between one of said pair of second rotation units and one of said pair of outer walls, thereby enabling said second arc-shaped guiding slot to be rotated along said second arc-shaped guiding rail.

3. The laborsaving rotation shaft device as claimed in claim 2, wherein a circumference of said first arc-shaped guiding slot is communicated with a first position limiting block, and each of said pair of second rotation units is correspondingly disposed with a first position limiting protrusion capable of being abutted against said first position limiting block; a circumference of said second arc-shaped guiding slot is communicated with a second position limiting block, and each of said pair of second rotation units is correspondingly disposed with a second position limiting protrusion capable of being abutted against said second position limiting block; and said bottom seat is respectively formed with an elongated slit corresponding to each of said pair of second rotation units, each of said elongated slits is served to allow each of said first position limiting protrusions to enter and pass, thereby enabling said pair of second rotation units in a rotating status to be parallel with each other.

4. The laborsaving rotation shaft device as claimed in claim 1, wherein said first rotation unit further includes a connection member, and said first rotation unit and said connection member is combined as one piece by utilizing a positioning and fastening mechanism for forming a linking status.

5. The laborsaving rotation shaft device as claimed in claim 4, wherein said first rotation unit includes a left rotation member and a right rotation member which are in an engaged status; said positioning and fastening mechanism is respectively formed with a positioning tenon at rear ends of said left rotation member and said right rotation member, a front end of said connection member is formed with two positioning slots allowing two said positioning tenons to be inserted and positioned, so that said left rotation member, said right rotation member and said connection member are combined as one piece.

6. The laborsaving rotation shaft device as claimed in claim 1, wherein said friction torsion mechanism includes a core shaft disposed between said pair of inner walls of said first rotation unit, and said connection rod is axially disposed with a C-shaped covering member of said torsion unit sleeved on said core shaft.

7. The laborsaving rotation shaft device as claimed in claim 6, wherein an outer circumference of said core shaft is formed with a first plane, and an inner circumference of said C-shaped covering member is formed with a second plane.

8. The laborsaving rotation shaft device as claimed in claim 1, wherein said base is connected to a rear surface of flat electronic device, said first rotation unit is connected at a front end of a supporter, so that said supporter is formed with a motion with automatically unfolding and folding assistance effect relative to said flat electronic device.

9. The laborsaving rotation shaft device as claimed in claim 8, wherein two adjacent surfaces of said rear surface of said flat electronic device and said supporter are respectively disposed with a pair of movable magnets and a pair of fixed magnets, said pair of movable magnets are respectively accommodated in an accommodation slot formed at two sides defined on said rear surface of said flat electronic device, and one side defined in each of said accommodation slots is disposed with a magnetic member at a location which is not corresponding to each of said pair of fixed magnets, a pair of said magnetic members are served to attract said pair of movable magnets for displacements to form an unlocked status.

10. The laborsaving rotation shaft device as claimed in claim 1, wherein said bottom portion of said base is respectively formed with an elongated slit corresponding to each of said pair of second rotation units, each of said elongated slits is served to allow one end of each of said pair of second rotation units to enter and pass, thereby enabling said pair of second rotation units in said rotating status to be parallel with each other.

* * * * *